(12) United States Patent
Hackleman

(10) Patent No.: US 11,443,128 B1
(45) Date of Patent: Sep. 13, 2022

(54) MATERIAL COMPOSITION IDENTIFICATION TAG

(71) Applicant: Justin Hackleman, Odessa, TX (US)

(72) Inventor: Justin Hackleman, Odessa, TX (US)

(*) Notice: Subject to any disclaimer, the term of this patent is extended or adjusted under 35 U.S.C. 154(b) by 0 days.

(21) Appl. No.: 17/364,346

(22) Filed: Jun. 30, 2021

(51) Int. Cl.
*G06K 7/10* (2006.01)

(52) U.S. Cl.
CPC .................. *G06K 7/10366* (2013.01)

(58) Field of Classification Search
CPC .................................................. G06K 7/10366
USPC ........................................ 235/487, 492, 451
See application file for complete search history.

(56) References Cited

U.S. PATENT DOCUMENTS

| 8,855,809 | B2 | 10/2014 | Spencer et al. |
| 8,861,675 | B2 | 10/2014 | Sommer, Jr. et al. |
| 10,207,296 | B2 | 2/2019 | Garcia et al. |
| 2003/0212467 | A1* | 11/2003 | Ogihara ............ G06Q 10/06 700/226 |
| 2014/0326507 | A1 | 11/2014 | Spriggs |

* cited by examiner

*Primary Examiner* — Jamara A Franklin
(74) *Attorney, Agent, or Firm* — Law Office of Jeff Williams PLLC; J. Oliver Williams

(57) ABSTRACT

A material composition identification assembly includes a unique metallic composition tag and a reader unit. The tag is associated with and coupled to a particular object, such as a pipe. The tag consists of a unique percent composition of a plurality of elements. The tag is placed within a portion of the pipe. The reader unit includes an input/output interface configured to detect the material composition tag. The reader unit is configured to process the material composition tag and identify the percent composition of the plurality of elements. The reader compares the percent composition to a database of numerical identifiers to isolate the historical data of the object.

20 Claims, 3 Drawing Sheets

MATERIAL COMPOSITION IDENTIFICATION TAG

BACKGROUND OF THE INVENTION

1. Field of the Invention

The present application relates to a method of identification for drilling pipe, and more particularly to a unique metallurgical tag/slug incorporated into the drilling pipe.

2. Description of Related Art

Modern oil well drilling technology has become extremely sophisticated, having many complexities, and increased costs. Greater depths can be reached now then at times past. Drillers are able to drill at angles and make turns deep in the earths crust to enable horizontal drilling. These may be directed either horizontally, obliquely or vertically. Despite the extreme complexity of modern drilling apparatus, the basics of the procedure has remained relatively straight forward.

In an oil well drilling operation, a drill head is powered downwardly from the well site into the earth and is supported by a plurality of drill pipe segments typically referred to as "drill pipes". The drill pipe segments include male and female ends which facilitate coupling the drill pipe segments in series to form extended strings of drill pipe. A drill rig on the surface at the well site controls and powers the drilling operation and as the drill head advances, successive segments of drill pipe which are often called "sticks" are added to the drill pipe string.

With ever deeper drilling and the capability of vertical, angled and/or horizontal drilling paths, the extent of distance covered in any drilling operation becomes substantial. As the drill head advances, the number of drill pipes joined to drive and support the drill head in a typical operation reaches hundreds or even thousands of drill pipe segments. In this environment, failure of one drill pipe in the extended string of segments results in substantial loss of time and money.

In order to replace the failed drill pipe much of the drill pipe string must be withdrawn by the well drilling rig, segment by segment, to extract and replace the failed pipe. Once the failed pipe has been replaced, the entire string must again be reassembled and lowered into the well hole, segment by segment. This process is extremely expensive and time consuming.

The large economic impact of one failed pipe has forced practitioners in the well drilling arts to make every effort to ensure that each drill pipe used is in sound condition and has not suffered fatigue, corrosion or physical damage. Damages may be seen as minute cracking or overstraining in prior use. Trained and certified inspectors (often called "level three" inspectors) are often used to examine each drill pipe for level one compliance before the drill pipe is used.

The basic problem in the oil well arts is that the number of drill pipes in existence is enormous and drill pipes are transferred throughout the system among successive user's. In addition, a substantial number of pipe manufacturers provide drill pipes. Accordingly, a typical well operator will have large numbers of drill pipe on the premises which have been received from multiple sources and which have moved throughout the oil drilling industry in some instances being transferred between several operators. As such, the typical well operator is faced with utilizing a substantial number of drill pipes each having a "history" which is difficult if not impossible to determine by examination of the drill pipe. Thus, for each drill pipe, the extent and character of its previous use as well as other critical factors such as the number of reconditioning processes it has received cannot be determined and raises an element of uncertainty and potential risk for the well operator. As a result, despite the use of the above-mentioned level three inspectors, a well operator is unable to assess these other elements in determining whether or not a particular drill pipe is truly suitable for use.

Although strides have been made, shortcomings remain. Accordingly, despite substantial efforts and expertise applied to physical examination of drill pipes prior to use, there remains nonetheless a continuing need in the art for a method and apparatus which permits the unique identifying of drill pipe so as to reliably enable the determination of any one of a number of physical and historical characteristics and uses of the drill pipe. Existing methods may include stamping a number on each drill pipe similar to a vehicle identification number. External metal tags may be used but are prone to be more of a nuisance or fall off during use of the drill pipe. It is desired that an assembly and method be provided that provides a unique identifier into the drill pipe that does not compromise drill pipe characteristics and is located internally.

BRIEF SUMMARY OF THE INVENTION

It is an object of the present application to provide an assembly and method of applying and detecting a unique metallurgical identification within a drill pipe. The method of identification will be applied at least partially internally to the drill pipe to avoid external abrasions which may prematurely remove the identifier. Additionally, the identifier will be configured to minimize impact to functional characteristics of the drill pipe. The metallurgical identifier may be removable and may be made from similar or dissimilar metals from that of the drill pipe.

It is a further object of the present application that a reader unit be used to scan and identify the metallurgical identifier in the drill pipe. The reader unit will be configured to selectively isolate the metallurgical properties therein of the identifier which is then associated with a particular corresponding numerical number. The reader unit may provide custom information such as percent composition, percent error, element names, and various system functions to assist an operator.

It is an object of the present application to utilize a method of marking the drill pipe that does not mar or burn the surface of the pipe, thereby altering the properties of the drill pipe. Additionally, the method is such that it avoids costly steps during manufacture of the drill pipe such as laser etching, stamping, or welding. The location of the tag can be discernable and quick to identify through a brief scan.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
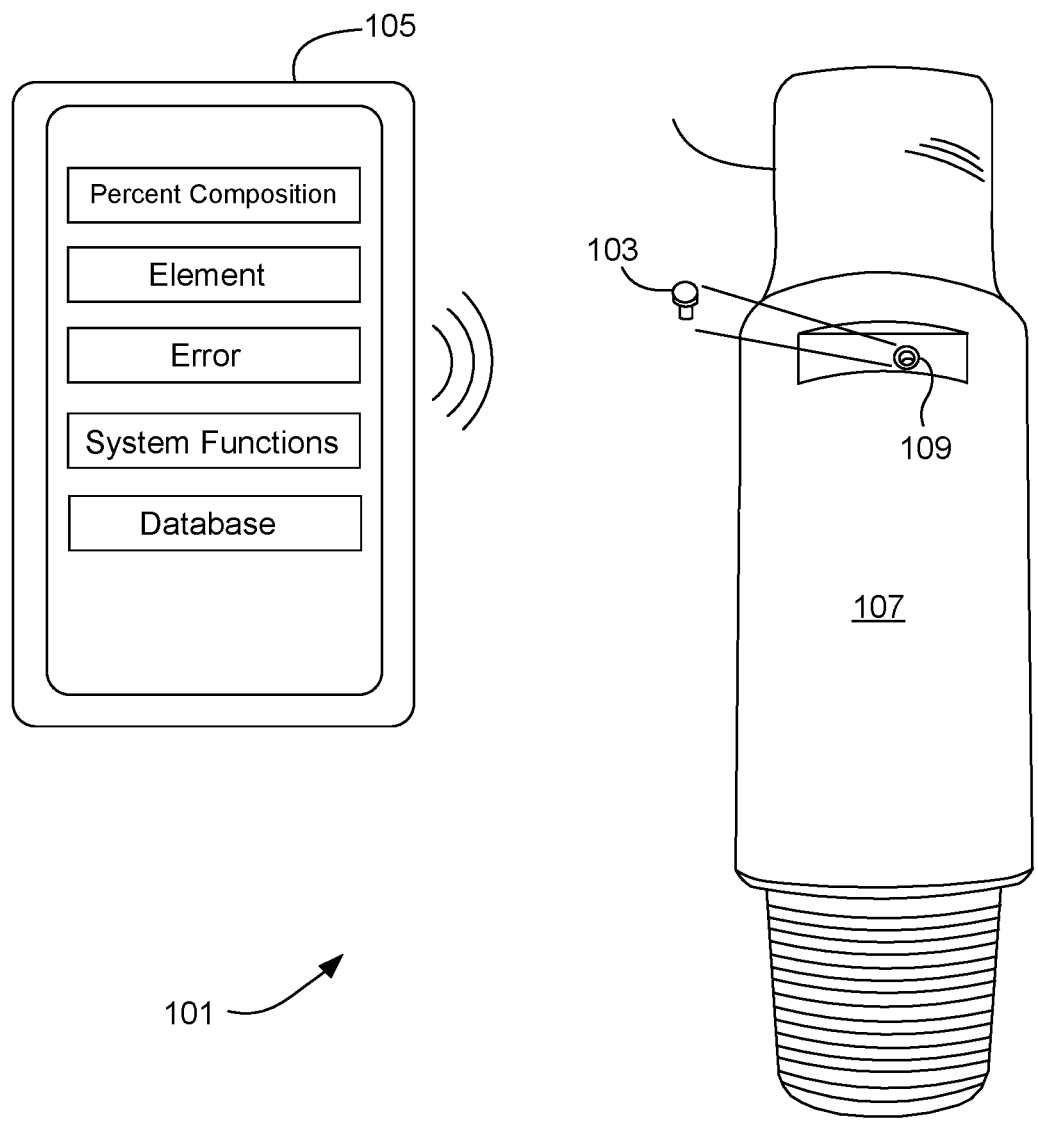
FIG. 1 is a side view of a material composition tag and corresponding reader unit according to an embodiment of the present application.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method in accordance with the present application overcomes one or more of the above-discussed problems commonly associated with the prior art discussed previously. In particular, the material composition tag of the present application includes a physical tag that is inserted into a portion of an object. The tag includes a unique identifiable set of metallurgical properties. The metallurgical properties are associated with a corresponding identifier for the object. Avoidance of external tags or etched/stamped numbers on the object minimizes manufacturing costs greatly and prevents wear or use from making such numbers unreadable over time. These and other unique features are discussed below and illustrated in the accompanying drawings.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the Figures wherein like reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

Referring now to FIG. 1 in the drawings, a material composition tag 103 along with the reader unit 105 are illustrated. Assembly 101 is shown to include the tag 103 and the reader unit 105. The reader unit 105 is configured to selectively scan an object to detect the tag 103. The reader unit 105 is then configured to analyze properties of the tag to isolate its unique composition. This unique composition of tag 103 is compared against known compositions to isolate a unique numerical identifier for the object. This identifier is used to track historical uses or other characteristics of the object from manufacture.

As seen in FIG. 1, assembly 101 is used with an object, such as a drill pipe 107. Drill pipe 107 is a metallic pipe used in the oil and gas industry. It is known that assembly 101 may be used with any pipe or object and is not herein limited only to drill pipe 107. Drill pipe 107 is used for exemplary purposes herein. Tag 103 is a metallic member that has been formed from a selected combination of metals, such that it has a unique composition. An example of the one or more materials used in tag 103 may be from the following elements: Ti, Cr, Mn, Fe, Ni, Mo, Pb, and Bi. Other elements may be included. In one embodiment, tag 103 may be based on a percent composition of at least 8 different elements. The elements may be metallic in nature. Tag 103 includes a unique percent amount of each element. As each tag 103 is unique, each tag 103 is associated with a corresponding numerical identifier. An operator may merely scan tag 103 with reader 105 and obtain the numerical identifier and/or pull up the historical data with respect to that particular object/pipe 107.

Figure 2:
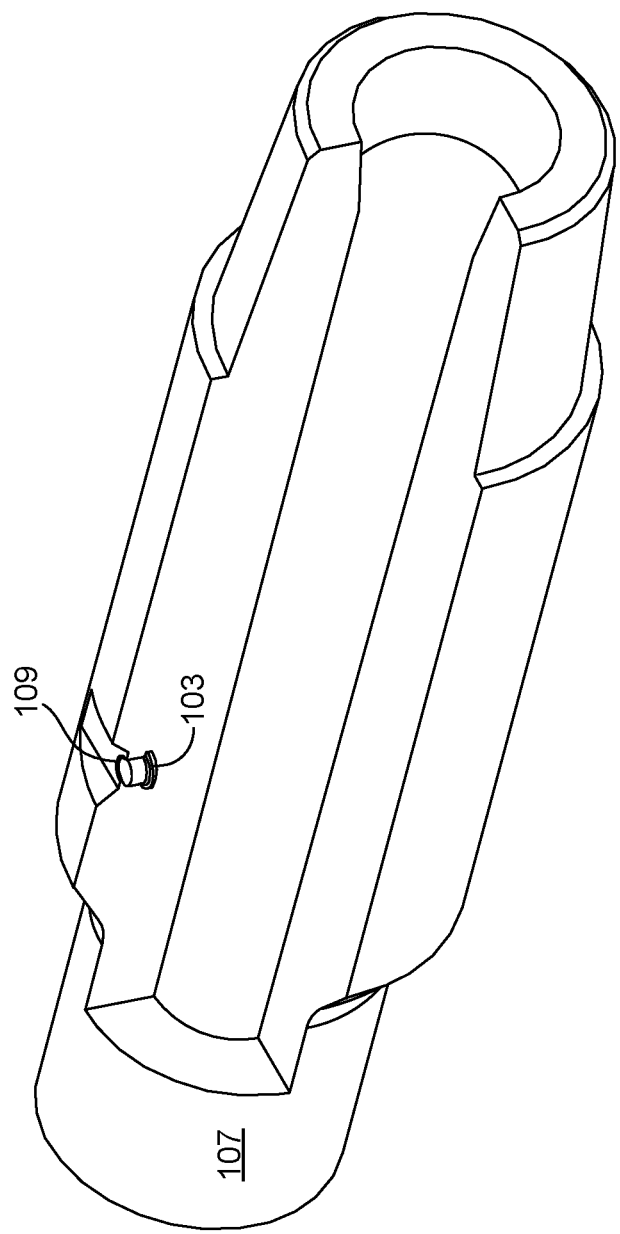
FIG. 2 is a section view of a pipe used with the material composition tag and reader unit of FIG. 1.

Referring now also to FIG. 2 in the drawings, a section view of pipe 107 is illustrated. Tag 103 may be located at least partially within an interior of pipe 107. It may be coupled with interference fit (i.e. press fit or threaded) or through the use of an adhesive. The act of welding it within a portion of pipe 107 is not necessarily preferred as welding may interfere with the unique composition of tag 103. As seen in FIG. 1, an aperture 109 may be located in a side wall of pipe 107. Tag 103 is pass into aperture 109. It is desired that tag 103 is seated below or flush to the exterior surface of pipe 107 to prevent protrusion beyond where it may expose the tag 103 to excessive debris and wear and tear during use.

It is important to note that tag 103 may be inserted into aperture 109 during manufacture of pipe 107 or after manufacture. In some embodiments, tag 103 may be removable. If replaced, the new tag may have a different unique material composition which would need to be linked with the numerical identifier of the pipe 107. Reader 105 may adjust the link between tag 103 and the numerical identifier. Additionally, tag 103 minimizes manufacturing costs by avoiding the need to stamp or etch a particular number on the outer surface. Furthermore, those numbers may become unreadable over time and become indistinguishable. Use of tag 103 also avoids the need to weld or alter the material of pipe 107 through some post treating process such as welding, burning, optical etching with lasers and so forth.

Figure 3:
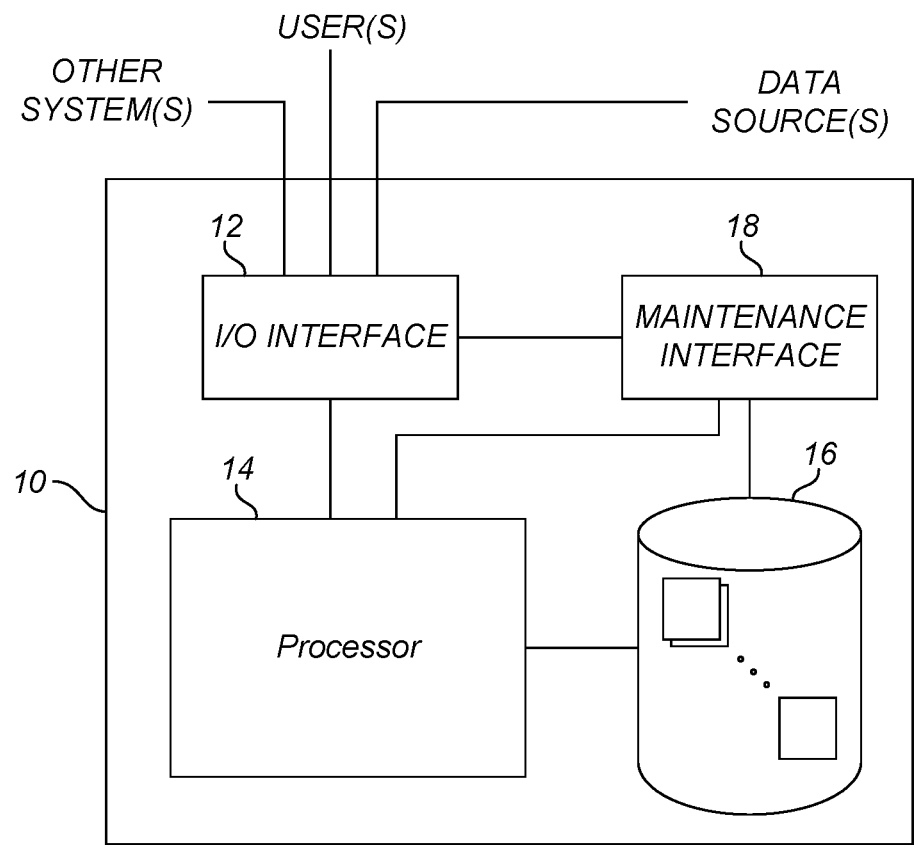
FIG. 3 is a schematic of a reader unit of FIG. 1.

Referring now also to FIG. 3 in the drawings, a schematic of electronic architecture 10 of reader unit 105 is illustrated. Reader unit 105 is an electronic device configured to capture and transmit data, store and retrieve data, and analyze data. Reader unit 105 may include one or more variations or types of system architecture 10. Architecture 10 includes one or more operable components to facilitate communication, storage of data, processing capabilities, and more.

The architecture 101 includes an input/output (I/O) interface 12, a control processor 14, a database 16, and a maintenance interface 18. Alternative embodiments can combine or distribute the input/output (I/O) interface 12, control processor 14, database 16, and maintenance interface 18 as desired. Embodiments of the architecture 101 can include one or more computers that include one or more processors and memories configured for performing tasks described herein below. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks. Furthermore, the computers may use transitory and non-transitory forms of computer-readable media. Non-transitory computer-readable media is to be interpreted to comprise all computer-readable media, with the sole exception of being a transitory, propagating signal.

The I/O interface 12 provides a communication link between external users, systems, and data sources and components of the architecture 101. The I/O interface 12 is in communication with the control processor 14 and database 16 and is configured to provide an interactive link between the operators and remote parties. The I/O interface 12 can be configured for allowing one or more users to input information to the architecture 101 via any known input device. Examples can include a keyboard, mouse, touch screen, microphone, and/or any other desired input device. The I/O interface 12 provides a display portal defining a plurality of visually perceptible elements corresponding to the prediction data. The I/O interface 12 can be configured for allowing one or more users to receive information output from the architecture 101 via any known output device. Examples can include a display monitor, a printer, a speaker, and/or any other desired output device. The I/O interface 12 can be configured for allowing other systems to communicate with the architecture 101. For example, the I/O interface 12 can allow one or more remote computer(s) to access information, input information, and/or remotely instruct the architecture 101 to perform one or more of the tasks described herein. The I/O interface 12 can be configured for allowing communication with one or more remote data sources. For example, the I/O interface 12 can allow one or more remote data source(s) to access information, input information, and/or remotely instruct the architecture 101 to perform one or more of the tasks described herein.

The database 16 provides persistent data storage (computer readable storage media, i.e. hardware) for architecture 101. Database 16 is in communication with control processor 14 and I/O interface 12. While the term "database" is primarily used, a memory or other suitable data storage arrangement may provide the functionality of the database 16. In alternative embodiments, the database 16 can be integral to or separate from the architecture 101 and can operate on one or more computers. The database 16 preferably provides non-volatile data storage for any information suitable to support the operation of the architecture 101, including various types of data necessary to perform the functions and feature discussed below.

The maintenance interface 18 is configured to allow users to maintain desired operation of the architecture 101. In some embodiments, the maintenance interface 18 can be configured to allow for reviewing and/or revising the data stored in the database 16 and/or performing any suitable administrative tasks commonly associated with database management. This can include, for example, updating database management software, revising security settings, and/or performing data backup operations. In some embodiments, the maintenance interface 18 can be configured to allow for maintenance of the control processor 14 and/or the I/O interface 12. This can include, for example, software updates and/or administrative tasks such as security management and/or adjustment of certain tolerance settings.

The control processor 14 can be configured to perform a process or a plurality of processes such as the processes described herein in connection with the associated Figures. Additionally, control processor 14 includes software programmed to compile properly communicate with the interested parties. Processor 14 includes a non-transitory computer-readable medium with instructions stored thereon to execute predetermined steps. Various functions of the control processor 14 may be realized, such as determining material percent compositions, uploading and downloading of visual data, compilation and submission of data, and so forth.

Reader unit 105 is configured to identify the presence of tag 103 and to analyze the material composition of tag 103. Reader unit 105 includes a display visible to an operator wherein unit 105 is configured to display data related to pipe 107 and/or tag 103 for interpretation by the operator. As seen in FIG. 1, reader unit 105 may present, via the display, selected information to the operator, such as percent composition of tag 103, a list of elements detected, percent error, and one or more system functions. Internally is stored the database to store and selectively retrieve select historical data for pipe 107.

A user is able to activate and deactivate unit 105 in performing a scan. The scan performed may include X-ray positive metal identification for example. Unit 105 is configured to compare the percent composition with that of a plurality of numerical identifiers associated with a plurality of pipes 107. Each numerical identifier has specific historical data related to the use and/or manufacture of pipe 107. In operation, an operator is able to update the historical data in real time as the pipe 107 is used.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A material composition identification assembly for use with an object, comprising:
    a material composition tag consisting of a unique percent composition of a plurality of elements and located within an interior of the object; and
    a reader unit including an input/output interface configured to detect the material composition tag, the reader unit configured to process the material composition tag and identify the percent composition of the plurality of elements;
    wherein the reader unit is configured to compare the percent composition to the database of numerical identifiers to isolate the historical data of the object.

2. The assembly of claim 1, wherein the percent composition is based on at least 8 different elements.

3. The assembly of claim 1, wherein the percent composition of the plurality of materials is based on a plurality of metallic elements.

4. The assembly of claim 1, wherein the material composition tag is inserted internally within a portion of the object.

5. The assembly of claim 1, wherein the material composition tag avoids protrusion beyond an outer surface of the object.

6. The assembly of claim 1, wherein the material composition tag is removable.

7. The assembly of claim 6, wherein the reader unit is configured to adjust the material composition tag associated with a particular numerical identifier.

8. The assembly of claim 1, wherein the material composition tag is coupled to the object via interference fit.

9. The assembly of claim 1, wherein the reader unit includes the database of numerical identifiers.

10. The assembly of claim 1, wherein the reader unit is configured to modify the relationship between the material composition tag and the numerical identifier.

11. A material composition identification assembly, comprising:
    an object;
    a material composition tag consisting of a unique percent composition of a plurality of elements and located within an interior of the object; and
    a reader unit including:
        an input/output interface configured to detect the material composition tag, the reader unit configured to process the material composition tag and identify the percent composition of the plurality of elements; and
        a database containing a plurality of numerical identifiers uniquely associated with a plurality of various objects, each numerical identifier includes historical data for at least one object;
    wherein the reader unit is configured to compare the percent composition to the database of numerical identifiers to isolate the historical data of the object.

12. The assembly of claim 11, wherein the percent composition is based on at least 8 different elements.

13. The assembly of claim 11, wherein the percent composition of the plurality of materials is based on a plurality of metallic elements.

14. The assembly of claim 11, wherein the material composition tag is inserted internally within a portion of the object.

15. The assembly of claim 11, wherein the material composition tag avoids protrusion beyond an outer surface of the object.

16. The assembly of claim 11, wherein the material composition tag is removable.

17. The assembly of claim 16, wherein the reader unit is configured to adjust the material composition tag associated with a particular numerical identifier.

18. The assembly of claim 11, wherein the material composition tag is coupled to the object via interference fit.

19. The assembly of claim 11, wherein the reader unit is configured to update the historical data in real time as the object is used.

20. The assembly of claim 11, wherein the reader unit is configured to modify the relationship between the material composition tag and the numerical identifier.

* * * * *